US011955042B2

(12) United States Patent
Wu et al.

(10) Patent No.: US 11,955,042 B2

(45) Date of Patent: Apr. 9, 2024

(54) DISPLAY PANEL AND DISPLAY DEVICE

(71) Applicants: Changsha HKC Optoelectronics Co., Ltd., Changsha (CN); HKC Corporation Limited, Guangdong (CN)

(72) Inventors: Kerong Wu, Changsha (CN); Haijiang Yuan, Changsha (CN)

(73) Assignees: CHANGSHA HKC OPTOELECTRONICS CO., LTD., Changsha (CN); HKC CORPORATION LIMITED, Guangdong (CN)

(*) Notice: Subject to any disclaimer, the term of this patent is extended or adjusted under 35 U.S.C. 154(b) by 7 days.

(21) Appl. No.: 18/071,040

(22) Filed: Nov. 29, 2022

(65) Prior Publication Data

US 2023/0169901 A1 Jun. 1, 2023

(30) Foreign Application Priority Data

Nov. 30, 2021 (CN) ........................ 202111447372.5

(51) Int. Cl.
*G09G 3/00* (2006.01)

(52) U.S. Cl.
CPC .................................... *G09G 3/035* (2020.08)

(58) Field of Classification Search
CPC ....... G09G 3/035; G09F 9/301; G06F 1/1652; G06F 2203/04102
See application file for complete search history.

(56) References Cited

U.S. PATENT DOCUMENTS

| | | | | |
|---|---|---|---|---|
| 2018/0032106 | A1* | 2/2018 | Yu | G06F 1/1652 |
| 2018/0046300 | A1* | 2/2018 | Dun | G06F 3/0412 |
| 2018/0107306 | A1* | 4/2018 | Hong | G06F 1/1652 |
| 2018/0217679 | A1* | 8/2018 | Kwon | G06F 3/041 |

FOREIGN PATENT DOCUMENTS

| | | | |
|---|---|---|---|
| CN | 106482631 | B | 8/2019 |
| CN | 110580081 | A | 12/2019 |
| CN | 107665657 | B | 7/2021 |
| CN | 111583808 | B | 9/2022 |
| JP | 2007120192 | A | 5/2007 |
| KR | 20180047590 | A | 5/2018 |
| WO | 2021203887 | A1 | 10/2021 |

OTHER PUBLICATIONS

First Office Action dated Jul. 31, 2023 received in Chinese Patent Application No. CN 202111447372.5.

* cited by examiner

*Primary Examiner* — Temesghen Ghebretinsae
*Assistant Examiner* — Ivelisse Martinez Quiles
(74) *Attorney, Agent, or Firm* — Scully, Scott, Murphy & Presser, P.C

(57) ABSTRACT

A display panel and a display device are provided. The display panel includes a display region and a non-display region surrounding the display region. The non-display region is provided with multiple sensing components. The multiple sensing components each are configured to generate a first signal when the display panel is in a flattened state. When the display panel is in a partially-rolled state, the display panel includes a flattened part and a rolled part, a sensing component in the flattened part is configured to generate the first signal, and a sensing component in the rolled part is configured to generate a second signal. The multiple sensing components each are configured to generate the second signal when the display panel is in a fully-rolled state.

14 Claims, 7 Drawing Sheets

DISPLAY PANEL AND DISPLAY DEVICE

CROSS-REFERENCE TO RELATED APPLICATIONS

This application claims priority under 35 U.S.C. § 119(a) to Chinese Patent Application No. 202111447372.5, filed Nov. 30, 2021, the entire disclosure of which is incorporated herein by reference.

TECHNICAL FIELD

This disclosure relates to the field of display, and particularly to a display panel and a display device.

BACKGROUND

With development of flexible display technologies, rollable or curvable display panels have gradually become a new form of display.

For an existing rollable display panel, when used in daily life, a position to which the rollable display-panel is rolled cannot be determined.

SUMMARY

In a first aspect, a display panel is provided in the disclosure. The display panel includes a display region and a non-display region surrounding the display region. The non-display region is provided with multiple sensing components. The multiple sensing components each are configured to generate a first signal when the display panel is in a flattened state. When the display panel is in a partially-rolled state, the display panel includes a flattened part and a rolled part. A sensing component in the flattened part is configured to generate the first signal, and a sensing component in the rolled part is configured to generate a second signal. The multiple sensing components each are configured to generate the second signal when the display panel is in a fully-rolled state.

In a second aspect, a display device is further provided in the disclosure. The display device includes the display panel of the first aspect and a reel coupled with the display panel.

The display panel is rollable and flattenable relative to the reel.

BRIEF DESCRIPTION OF THE DRAWINGS

In order to describe technical solutions of implementations of the disclosure or related art more clearly, the following will give a brief introduction to the accompanying drawings used for describing implementations or the related art. Apparently, the accompanying drawings described below are merely some implementations of the disclosure. Based on these drawings, those of ordinary skill in the art can also obtain other drawings without creative effort.

DETAILED DESCRIPTION

Technical solutions of implementations of the disclosure will be described clearly and completely with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Figure 1:
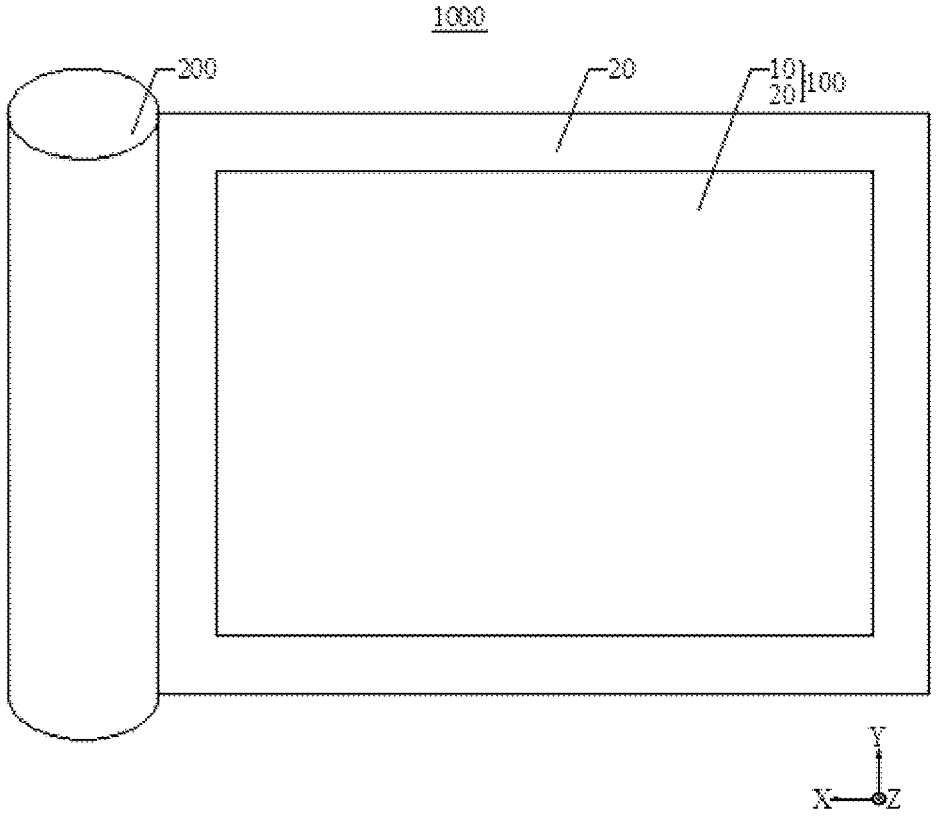
FIG. 1 is a schematic structural diagram of a display device in a flattened state provided in some implementations of the disclosure.
Figure 2:
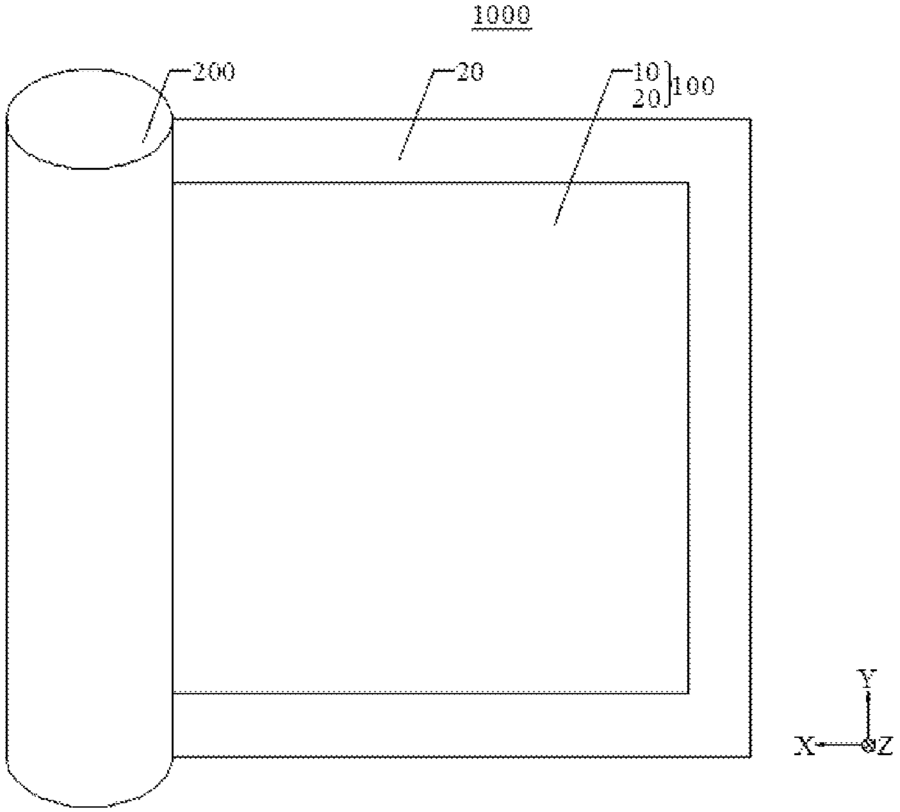
FIG. 2 is a schematic structural diagram of the display device illustrated in FIG. 1 when in a partially-rolled state.
Figure 3:
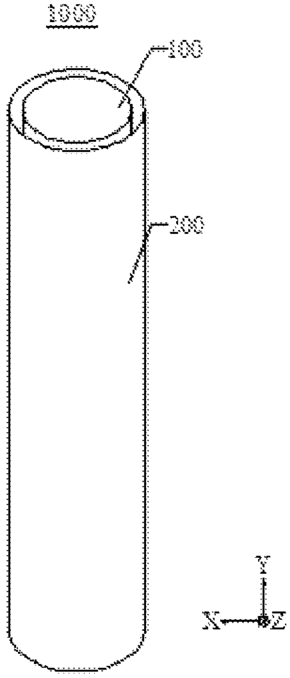
FIG. 3 is a schematic structural diagram of the display device illustrated in FIG. 1 when in a fully-rolled state.

Referring to FIG. 1, FIG. 2, and FIG. 3, FIG. 1 is a schematic structural diagram of a display device 1000 in a flattened state provided in some implementations of the disclosure. FIG. 2 is a schematic structural diagram of the display device 1000 illustrated in FIG. 1 when in a partially-rolled state. FIG. 3 is a schematic structural diagram of the display device 1000 illustrated in FIG. 1 when in a fully-rolled state.

The display device 1000 may be a mobile phone, a tablet computer, a notebook computer, a television, a display, and a wearable device, etc., and implementations of the disclosure are not limited in this regard. The wearable device may be a smart watch, glasses, a helmet, and a smart bracelet, etc. For the convenience of illustration, as to the display device 1000, a length direction is defined as an x-direction, a width direction is defined as a y-direction, and a thickness direction is defined as a z-direction. Each two of the x-direction, the y-direction, and the z-direction are perpendicular to each other.

In implementations herein, the display device 1000 includes a display panel 100 and a reel 200, where the display panel 100 includes a display region 10 and a non-display region 20 surrounding the display region 10. The display region 10 is configured to display an image. One end of the display panel 100 is coupled to the reel 200, and the other opposite end is a free end. In this example, the left end of the display panel 100 is coupled to the reel 200, and the right end is a free end. The display panel 100 is rollable and flattenable relative to the reel 200.

It should be noted that, "the display panel 100 is rollable relative to the reel 200" means that the display panel 100 can be rolled to wrap the outside surface of the reel 200 or be rolled and received in the reel 200, which is not limited in the disclosure.

As illustrated in FIG. 1, the display device 1000 is in the flattened state, and the display panel is also in the flattened state. The display region 10 of the display panel 100 can display an image up to the maximum area. As illustrated in FIG. 2, the display device 1000 is in the partially-rolled state, and the display panel 100 is also in the partially-rolled state. A part of the display panel 100 is rolled and received in the reel 200, and the other part is unrolled and outside the reel 200. In this case, an unrolled part of the display region 10 displays an image. As illustrated in FIG. 3, the display device 1000 is in the fully-rolled state, and the display panel 100 is also in the fully-rolled state. The display panel 100 is fully rolled and received in the reel 200.

While the display panel 100 is transitioning from the flattened state illustrated in FIG. 1 to the partially-rolled state illustrated in FIG. 2, the free end on the right of the display panel 100 moves along the positive direction of the x-axis, a part of the display panel 100 is rolled to be received in the reel 200, and a flattened area of the display region 10 of the display panel 100 is reduced. If the display panel 100 continues being rolled from the partially-rolled state illustrated in FIG. 2, the flattened area of the display region 10 will be reduced continuously until the display region 10 of the display panel 100 is fully rolled as illustrated in FIG. 3.

It should be noted that, terms used herein such as “upper”, “lower”, “left”, and “right”, etc. are illustrations with reference to orientations in FIG. 1, rather than indicate or imply that apparatuses or elements mentioned must have a certain orientation and be structured and operated in a certain orientation, and thus cannot be understood as limitation of the disclosure. The positive direction of the x-axis indicates the left, the negative direction of the x-axis indicates the right, the positive direction of the y-axis indicates an upper side, and the negative direction of the y-axis indicates a lower side.

Figure 4:
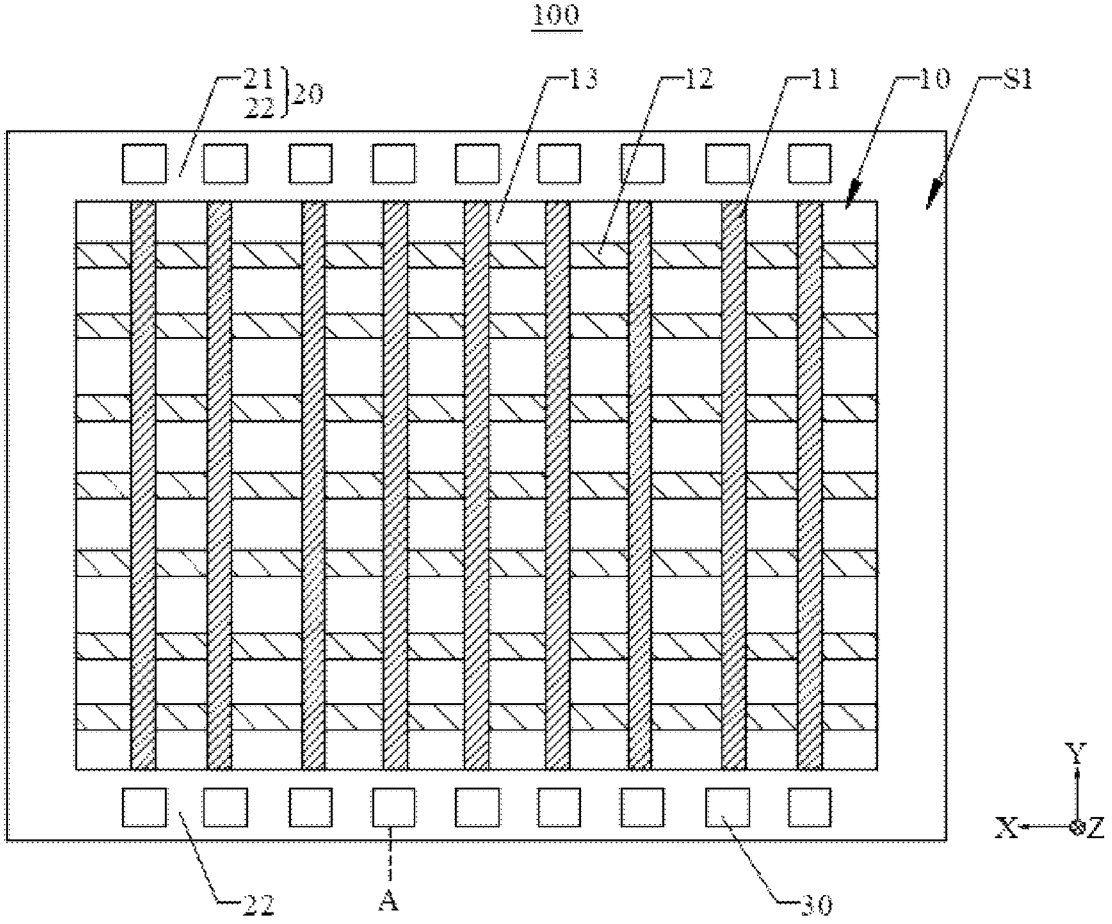
FIG. 4 is a schematic structural diagram of a display panel in a flattened state in the display device illustrated in FIG. 1.
Figure 5:
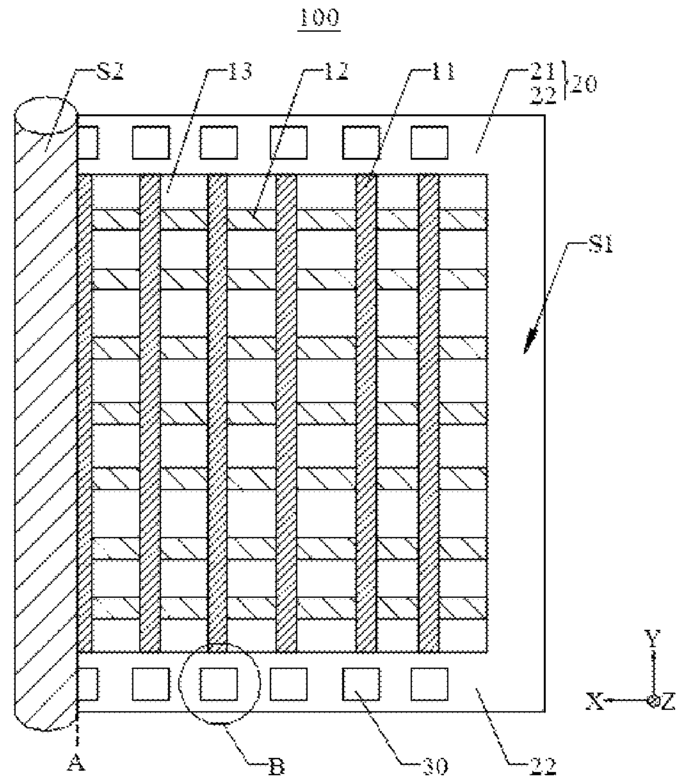
FIG. 5 is a schematic structural diagram of the display panel illustrated in FIG. 4 when in a partially-rolled state.

Refer to FIG. 4 and FIG. 5. FIG. 4 is a schematic structural diagram of a display panel 100 in a flattened state in the display device 1000 illustrated in FIG. 1. FIG. 5 is a schematic structural diagram of the display panel 100 illustrated in FIG. 4 when in a partially-rolled state.

As illustrated in FIG. 4, when the display panel 100 is in the flattened state, the whole display panel 100 is fully flattened. The display panel 100 is rollable along a first direction. As illustrated in FIG. 5, when the display panel 100 is in the partially-rolled state, the display panel 100 includes a flattened part S1 and a rolled part S2 connected with the flattened part S1. The rolled part S2 is rolled and received in the reel 200, and the flattened part S1 is configured to display an image.

The display region 10 of the display panel 100 is provided with multiple data lines 11, multiple scanning lines 12, multiple pixel units 13 at intersections of the data lines 11 and the scanning lines 12, and a pixel driving circuit (not illustrated). The data lines 11 are located in the display region 10, each data line 11 extends along a second direction, and the multiple data lines 11 are spaced apart along the first direction. The scanning lines 12 are located in the display region 10, each scanning line 12 extends along the first direction, and the multiple scanning lines 12 are spaced apart along the second direction. The first direction is not parallel to the second direction. In implementations herein, the first direction is the x-direction illustrated in the drawings, and the second direction is the y-direction illustrated in the drawings.

The multiple pixel units 13 are located at positions defined by the data lines 11 and the scanning lines 12. The pixel driving circuit is coupled to the data lines 11 and the scanning lines 12, and configured to drive the pixel units 13 to display an image by respectively controlling signals inputted to the data lines 11 and the scanning lines 12. In implementations herein, the pixel driving circuit includes a thin-film transistor(s).

The non-display region 20 includes a first non-display sub-region 21 and a second non-display sub-region 22 that are disposed opposite to each other. The first non-display sub-region 21 and the second non-display sub-region 22 are located on two opposite sides of the display region 10 respectively along the y-direction. In implementations herein, the first non-display sub-region 21 is located above the display region 10, and the second non-display sub-region 22 is located below the display region 10. The non-display region 20 is provided with multiple sensing components 30. The multiple sensing components 30 are configured to sense a position to which the display panel 100 is rolled.

In implementations herein, some of the multiple sensing components 30 are located in the first non-display sub-region 21 and spaced apart along the x-direction, and some of the multiple sensing components 30 are located in the second non-display sub-region 22 and spaced apart along the x-direction. The multiple sensing components 30 in each of the first non-display sub-region 21 and the second non-display sub-region 22 are spaced apart along the x-direction and correspond to positions of the multiple data lines 11.

Figure 6:
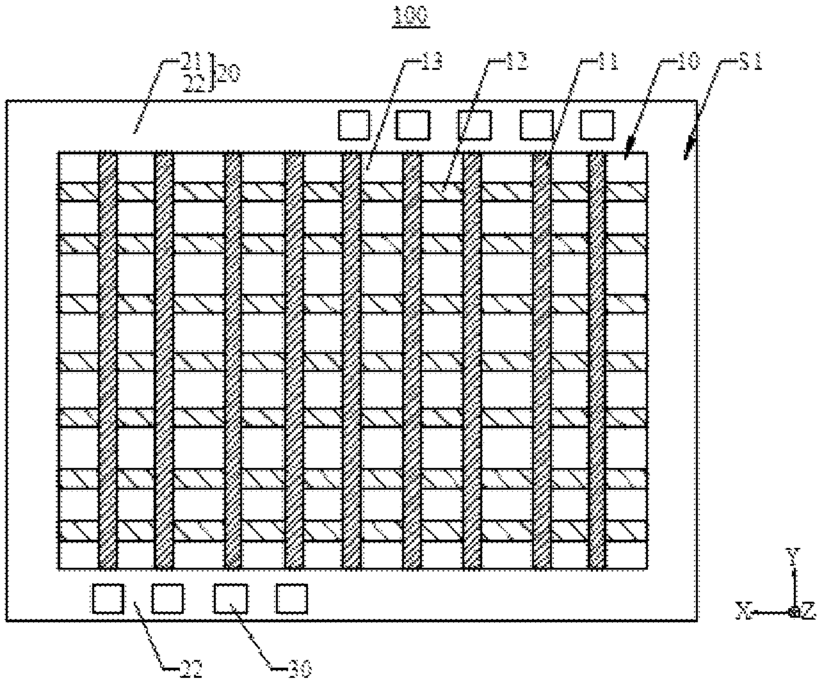
FIG. 6 is a schematic diagram of multiple sensing components that are located in a first non-display sub-region and a second non-display sub-region according to an example of the disclosure.

According to implementations herein, the multiple sensing components 30 are disposed in the non-display region 20 that is above and below the display region 10, such that the display region 10 can still display even if upper and lower positions in the display region 10 are not aligned or upper and lower image widths are different. It should be understood that, in other implementations, the multiple sensing components 30 can be disposed only in the first non-display sub-region 21 in which the multiple sensing components 30 are spaced apart along the x-direction; or the multiple sensing components 30 can be disposed only in the second non-display sub-region 22 in which the multiple sensing components 30 are spaced apart along the x-direction. Optionally, as illustrated in FIG. 6, the multiple sensing components 30 are disposed in a part of the first non-display sub-region 21 and a part of the second non-display sub-region 22, where multiple sensing components 30 in each of the first non-display sub-region 21 and the second non-display sub-region 22 are spaced apart along the x-direction.

As illustrated in FIG. 4, when the display panel 100 is in the flattened state, the multiple sensing components 30 are also in the flattened state and each is configured to generate a first signal.

As illustrated in FIG. 5, when the display panel 100 is rolled to preset position A (the position denoted by a dotted line in the drawing) along the x-direction, the display panel 100 is in the partially-rolled state. The display panel 100 includes the flattened part S1 and the rolled part S2 connected with the flattened part S1. In this implementation, a part on the left of preset position A is the rolled part S2, and a part on the right of preset position A is the flattened part S1. When the display panel 100 is rolled to preset position A, a sensing component 30 in the rolled part S2 is subjected to a stretching force along the x-direction due to rolling of the display panel 100, and thus generates a second signal; a sensing component 30 in the flattened part S1 generates the first signal. When the display panel 100 is rolled to preset position A along the x-direction, the sensing component 30 in the rolled part S2 is subjected to a stretching force, while the sensing component 30 in the flattened part S1 is not subjected to such stretching force. Therefore, there is a difference between the first signal and the second signal. According to the difference between the second signal and the first signal, it is possible to identify a range of the rolled part S2 and thus identify and distinguish the rolled part S2 and the flattened part S1, thereby determining a position to which the display panel 100 is rolled.

Figure 7:
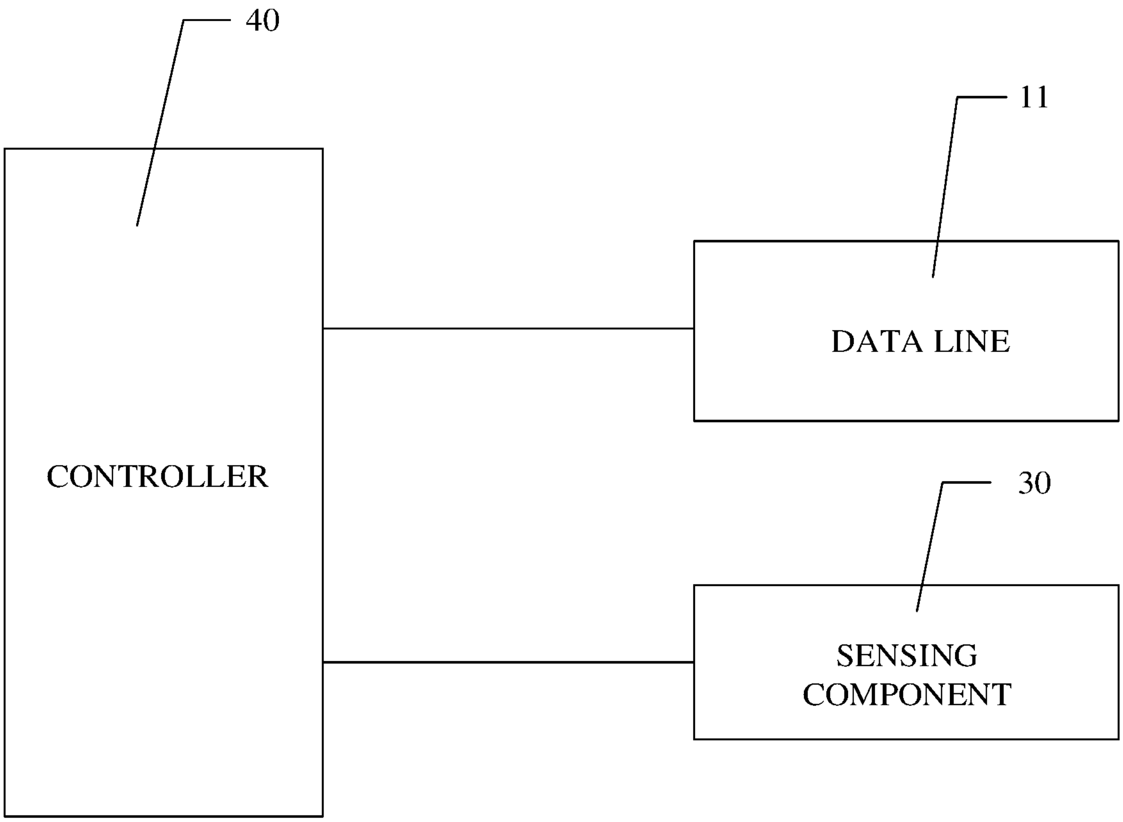
FIG. 7 is a schematic diagram illustrating coupling between a data line and a sensing component in the display panel illustrated in FIG. 4.

Referring to FIG. 7, FIG. 7 is a schematic diagram illustrating coupling between a data line 11 and a sensing component 30 in the display panel 100 illustrated in FIG. 4.

The display device 1000 further includes a controller 40. The controller 40 is electrically coupled with each of the multiple sensing components 30 and each of the multiple data lines 11. The sensing component 30 transmits a signal to the controller 40. Once receiving the signal, the controller 40 identifies and distinguishes the flattened part S1 and the rolled part S2, and then transmits a signal to data lines 11 in the flattened part S1 to control image display of a pixel unit 13 that is defined by the data lines 11 and scanning lines 12 in the flattened part S1.

Specifically, the sensing component 30 in the flattened part S1 generates the first signal, and the sensing component 30 in the rolled part S2 generates the second signal different from the first signal. By identifying the second signal and the first signal, the controller 40 identifies and distinguishes the flattened part S1 and the rolled part S2, and then controls the pixel driving circuit to transmit a signal to the data lines 11 in the flattened part S1. As such, the controller 40 controls image display of the pixel area 13 that is defined by the data lines 11 and the scanning lines 12 in the flattened part S1, thereby controlling the flattened part S1 to display an image. In this way, display resolution can be adjusted adaptively according to the size of the flattened part S1, and display performance can be improved. In implementations herein, the controller 40 is an integrated chip.

In the display device 1000 provided in implementations, there is a difference between the first signal generated by the sensing component 30 in the flattened part S1 and the second signal generated by the sensing component 30 in the rolled part S2. The controller 40 is configured to identify the first signal and the second signal, so as to identify the flattened part S1 and the rolled part S2 and thus determine the position to which the display panel 100 is rolled. After identifying the position, the controller 40 generates a signal for controlling image display of the pixel unit 13 that is defined by the data lines 11 and the scanning lines 12 in the flattened part S1, so as to control image display of the flattened part S1 of the display panel 100. As such, display resolution can be adjusted adaptively according to the size of the flattened part S1, and display performance can be improved.

Figure 8:
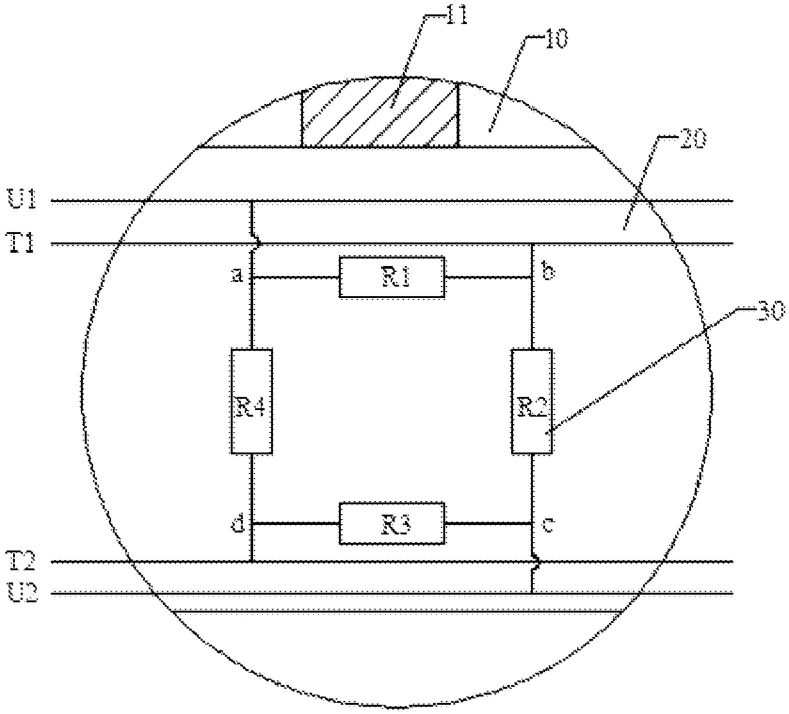
FIG. 8 is a partially enlarged diagram of part B of the display panel illustrated in FIG. 5.

Referring to FIG. 8, FIG. 8 is a partially enlarged diagram of part B of the display panel 100 illustrated in FIG. 5.

Each sensing component 30 includes a first input end a, a first detection end b, a second input end c, and a second detection end d. A first resistor R1 is coupled between the first input end a and the first detection end b. A second resistor R2 is coupled between the first detection end b and the second input end c. A third resistor R3 is coupled between the second input end c and the second detection end d. A fourth resistor R4 is coupled between the second detection end d and the first input end a. The first input end a is coupled to a first power line U1 of a power supply, and the second input end c is coupled to a second power line U2 of the power supply. A voltage difference between the first power line U1 and the second power line U2 is greater than zero. The first detection end b is coupled to a first detection line T1, and the second detection end d is coupled to a second detection line T2. The first detection line T1 and the second detection line T2 each are coupled to the controller 40, such that the controller 40 can receive a signal generated by the sensing component 30. "The voltage difference is greater than zero" means that the first power line U1 has a voltage different from the second power line U2, where the voltage of the first power line U1 may be higher than the voltage of the second power line U2, or the voltage of the second power line U2 may be higher than the voltage of the first power line U1.

In this implementation, the first input end a of each of the multiple sensing components 30 is electrically coupled to the first power line U1 of the power supply, and the second input end c of each of the multiple sensing components 30 is electrically coupled to the second power line U2 of the power supply, such that the power supply can apply constant voltage V to each sensing component 30 via the two input ends. The first detection end b and the second detection end d of each sensing component 30 are coupled to the controller 40, such that the controller 40 can receive, via the two detection ends, a signal from each sensing component 30.

Figure 9:
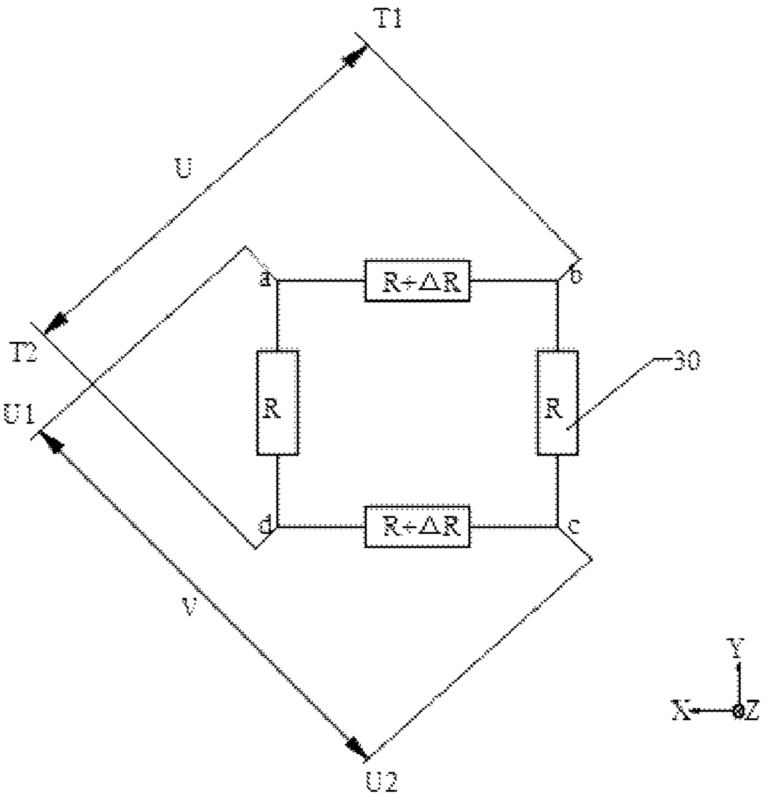
FIG. 9 is a schematic diagram illustrating sensing and identification of a roll position based on sensing components of the display panel illustrated in FIG. 8.

Referring to FIG. 9, FIG. 9 is a schematic diagram illustrating sensing and identification of a roll position based on sensing components 30 of the display panel 100 illustrated in FIG. 8.

When the display panel 100 is in the partially-rolled state, for the sensing component 30 in the flattened part S1, resistance values of the first resistor R1, the second resistor R2, the third resistor R3, and the fourth resistor R4 are equal, and the sensing component 30 in the flattened part S1 generates the first signal. For the sensing component 30 in the rolled part S2, resistance values of the first resistor R1 and the third resistor R3 are different from resistance values of the second resistor R2 and the fourth resistor R4, and the sensing component 30 in the rolled part S2 generates the second signal.

In this implementation, the first resistor R1 and the third resistor R3 of the sensing component 30 are force-sensitive resistors. When the display panel 100 is in the flattened state, resistance values of the first resistor R1, the second resistor R2, the third resistor R3, and the fourth resistor R4 of the sensing component 30 are equal to R.

The principle for sensing and identifying, based on the sensing component 30, a position to which the display panel 100 is rolled is as follows. A power supply is connected between the first input end a and the second input end c to supply constant voltage V. The first detection end b and the second detection end d are connected to the controller 40, and the controller 40 is used for identifying potential difference U between the first detection end b and the second detection end d. When the display panel 100 is in the flattened state, the whole display panel 100 is in the flattened state, the sensing components 30 are not subjected to a stretching force, and the first signal will be outputted between the first detection end b and the second detection end d of the sensing component 30. When the display panel 100 is in the partially-rolled state, the second signal will be outputted between the first detection end b and the second detection end d of the sensing component 30 in the rolled part S2 of the display panel 100; and the first signal will be outputted between the first detection end b and the second detection end d of the sensing component 30 in the flattened part S1 of the display panel 100. In this example, the second signal and the first signal each indicate the potential difference. The controller 40 can identify a difference between the potential difference indicated by the second signal and the potential difference indicated by the first signal, to identify a range of the rolled part S2, thereby identifying the position to which the display panel 100 is rolled.

Specifically, when the display panel 100 is in the flattened state, resistance values of the first resistor R1, the second resistor R2, the third resistor R3, and the fourth resistor R4 of the sensing component 30 are equal. In this case, a potential difference between the first detection end b and the second detection end d is zero, and the sensing component 30 generates the first signal.

When the display panel 100 is in the partially-rolled state, the sensing component 30 in the rolled part S2 is stretched because the display panel 100 is partially rolled along the x-direction. In this implementation, the first resistor R1 and the third resistor R3 are force-sensitive resistors, and resistance values of the first resistor R1 and the third resistor R3 will change when the first resistor R1 and the third resistor R3 are subjected to a stretching force along the x-direction. Suppose that the resistance values change by ΔR, i.e., resistance values of R1 and R3 each are R+ΔR, whereas resistance values of R2 and R4 remain unchanged and are still R. In this case, an electric potential of the first detection end b is V*R/(2R+ΔR), an electric potential of the second detection end d is V*(R+ΔR)/(2R+ΔR), and a potential difference between the first detection end b and the second detection end d is V*ΔR/(2R+ΔR). The sensing component 30 in the rolled part S2 generates the second signal, i.e., the second signal outputted by the sensing component 30 in the rolled part S2 indicates that the potential difference is V*ΔR/(2R+ΔR). Since the sensing component 30 in the flattened part S1 is not subjected to such stretching force along the x-axis, the potential difference between the first detection end b and the second detection end d is still zero, i.e., the first signal outputted by the sensing component 30 in the flattened part S1 indicates that the potential difference is zero. By identifying a difference between the potential difference indicated by the first signal and the potential difference indicated by the second signal, the controller 40 can identify a range of the rolled part S2, thereby identifying the position to which the display panel 100 is rolled.

In the display device 1000 in implementations of the disclosure, when the display panel 100 is in the partially-rolled state, the sensing component 30 in the rolled part S2 generates the second signal, and the sensing component 30 in the flattened part S1 generates the first signal. By identifying a difference between the second signal and the first signal, the controller 40 can determine whether the sensing component 30 is located in the rolled part S2 or the flattened part S1, thereby identifying a range of the rolled part S2 and a range of the flattened part S1 and thus identifying the position to which the display panel 100 is rolled. In addition, according to the identified position to which the display panel 100 is rolled, the controller 40 can control the flattened part S1 to display an image. As such, the display resolution can be adjusted adaptively according to the size of the flattened part S1 and the display performance can be improved.

In implementations herein, the first resistor R1 and the third resistor R3 are force-sensitive resistors, and the second resistor R2 and the fourth resistor R4 are normal resistors. It can be understood that, in other implementations, the first resistor R1, the second resistor R2, the third resistor R3, and the fourth resistor R4 each can be a force-sensitive resistor. When the display panel 100 is in the partially-rolled state, for the sensing component 30 in the rolled part S2, different from the first resistor R1 and the third resistor R3 that are subjected to a stretching force along the x-axis, resistance values of the second resistor R2 and the fourth resistor R4 are almost unchanged although the second resistor R2 and the fourth resistor R4 are subjected to a stress. Therefore, there is a difference between the second signal generated by the sensing component 30 in the rolled part S2 and the first signal generated by the sensing component 30 in the flattened part S1. In this case, the controller 40 can still identify the rolled part S2 and the flattened part S1 of the display panel 100, and adaptively adjust the display resolution according to the size of the flattened part S1.

Figure 10:
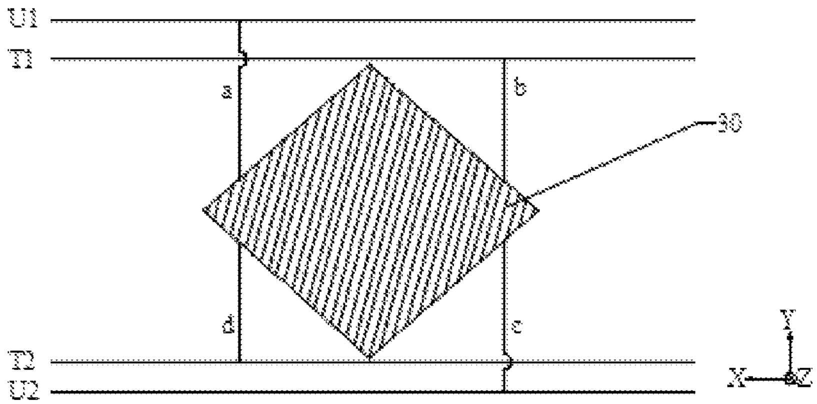
FIG. 10 is a schematic structural diagram of a sensing component provided in a first example.
Figure 11:
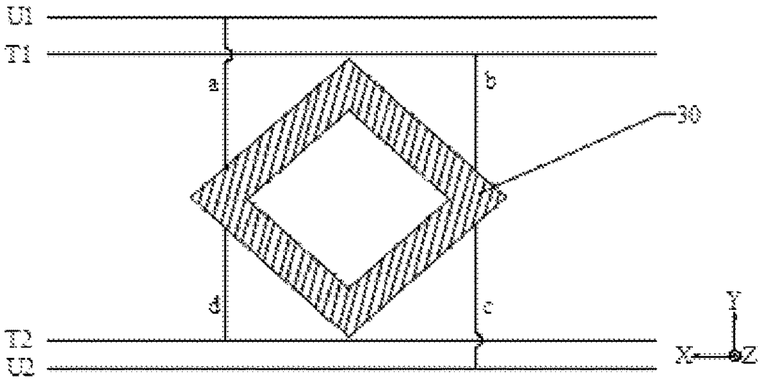
FIG. 11 is a schematic structural diagram of a sensing component provided in a second example.

Referring to FIG. 10 and FIG. 11, FIG. 10 is a schematic structural diagram of a sensing component 30 provided in a first example.

The sensing component 30 is made with a whole piece of material, and the sensing component 30 is made of an active-layer material or a pressure-sensitive metal. For example, the active-layer material may be Low Temperature Poly-Silicon (LTPS) or Indium Gallium Zinc Oxide (IGZO). The sensing component 30 of implementations herein is made of the active-layer material.

Referring to FIG. 11, FIG. 11 is a schematic structural diagram of a sensing component 30 provided in a second example.

The sensing component 30 in this example is different from the sensing component 30 in the first example in that the sensing component 30 in this example defines a through hole, where the through hole penetrates the sensing component 30 along the thickness direction (the z-direction illustrated) of the sensing component 30.

In an implementation, the pixel driving circuit in the display panel includes thin-film transistors. The thin-film transistor includes a gate, a gate insulating layer, an active layer, an ohmic contact layer, a source, and a drain. The sensing components 30 and the active layer of the thin-film transistor are on the same layer. If the sensing component 30 is made of an active-layer material, the sensing component 30 can be prepared while preparing the active layer of the thin-film transistor.

Figure 12:
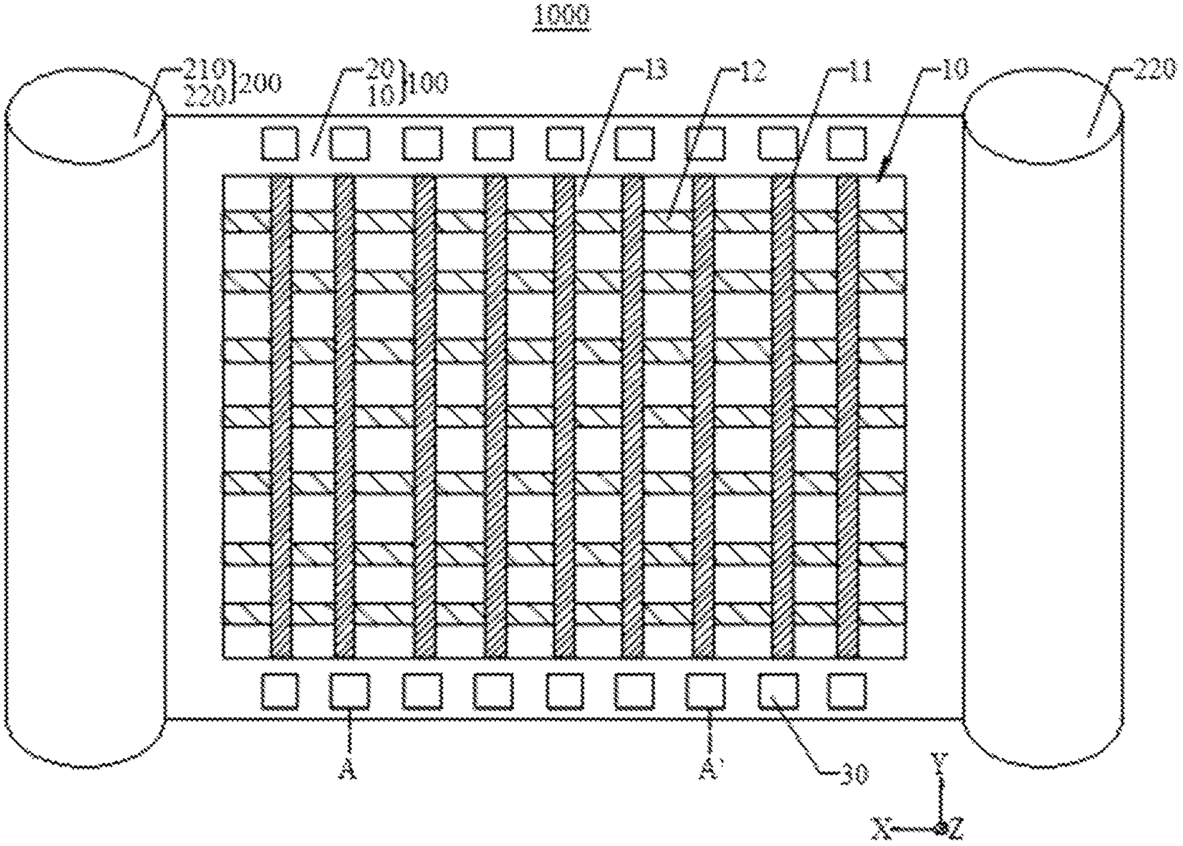
FIG. 12 is a schematic structural diagram of a display device provided in some implementations of this disclosure.

Referring to FIG. 12, FIG. 12 is a schematic structural diagram of a display device 1000 provided in some implementations of this disclosure.

The display device 1000 in this implementation is different from the display device 1000 in the above implementation in that the display device 1000 in this implementation has two reels 200, which include a first reel 210 and a second reel 220.

The first reel 210 and the second reel 220 are installed on two opposite sides of the display panel 100. Specifically, the first reel 210 is installed on a left side of the display panel 100 facing the positive direction of the x-axis, to roll and receive a left part of the display panel 100. The second reel 220 is installed on a right side of the display panel 100 facing the negative direction of the x-axis, to roll and receive a right part of the display panel 100. When rolling and receiving, the first reel 210 moves along the negative direction of the x-axis to roll and receive, and the second reel 220 moves along the positive direction of the x-axis to roll and receive. The first reel 210 and the second reel 220 may roll and receive the display panel 100 synchronously or asynchronously.

When the first reel 210 rolls and receives the display panel 100 to preset position A, and the second reel 220 rolls and receives the display panel 100 to preset position A', for the display panel 100, a part on the left of preset position A and a part on the right of preset position A' are rolled parts S2, and a part between preset position A and preset position A' is a flattened part S1. A sensing component 30 in the rolled parts S2 generates a second signal because the sensing component 30 is subjected to a stretching force along the x-axis, while a sensing component 30 in the flattened part S1 generates a first signal which is different from the second signal because the sensing component 30 is not subjected to such stretching force. By identifying a difference between the second signal and the first signal, a controller 40 can identify a range of the rolled parts S2 and thus determine a position to which the display panel 100 is rolled, and then input a signal to a data line in the flattened part S1 to control the flattened part S1 to display an image.

In the display device 1000 provided in this implementation, the first reel 210 and the second reel 220 can be used to roll and receive the left part and right part of the display panel 100 respectively. Due to rolling of the rolled parts S2 of the display panel 100 that are rolled and received in the first reel 210 and in the second reel 220, the sensing component 30 in the rolled parts S2 generates the second signal because the sensing component 30 is subjected to a stretching force along the x-axis, and the sensing component 30 in the flattened part S1 generates the first signal because the sensing component 30 is not subjected to such stretching force. By identifying the difference between the second signal and the first signal, the controller 40 can identify the range of the rolled parts S2, and then identify and determine the position to which the display panel 100 is rolled. As such, the display resolution can be adaptively adjusted according to the size of the flattened part S1, and the display performance of the display panel 100 can be improved.

The disclosure aims to provide a display panel and a display device. When the display panel is rolled, a position to which the display panel is rolled can be identified and determined.

A display panel is provided in the disclosure. The display panel includes a display region and a non-display region surrounding the display region. The non-display region is provided with multiple sensing components. The multiple sensing components each are configured to generate a first signal when the display panel is in a flattened state. When the display panel is in a partially-rolled state, the display panel includes a flattened part and a rolled part. A sensing component in the flattened part is configured to generate the first signal, and a sensing component in the rolled part is configured to generate a second signal. The multiple sensing components each are configured to generate the second signal when the display panel is in a fully-rolled state.

The display panel further includes a controller. The controller is electrically coupled with each of the multiple sensing components, and configured to control, according to the first signal and the second signal, the flattened part to display an image when the display panel is in the partially-rolled state.

The display region is provided with multiple data lines. The multiple data lines are electrically coupled with the controller. The controller is configured to, when the display panel is in the partially-rolled state, control the flattened part to display an image by controlling, according to the first signal and the second signal, a data line in the flattened part to work.

The display panel is rollable along a first direction. The non-display region includes a first non-display sub-region and a second non-display sub-region. The first non-display sub-region and the second non-display sub-region are located on two opposite sides of the display region respectively along a second direction. Some sensing components are spaced apart in the first non-display sub-region along the first direction, and some sensing components are spaced apart in the second non-display sub-region along the first direction.

The display panel is rollable along a first direction. The multiple sensing components are spaced apart along the first direction.

Each sensing component includes a first input end, a first detection end coupled with the controller, a second input end, a second detection end coupled with the controller, a first resistor coupled between the first input end and the first detection end, a second resistor coupled between the first detection end and the second input end, a third resistor coupled between the second input end and the second detection end, and a fourth resistor coupled between the second detection end and the first input end. A voltage difference between the first input end and the second input end is greater than zero. When the display panel is in the partially-rolled state, for a sensing component in the flattened part, resistance values of the first resistor, the second resistor, the third resistor, and the fourth resistor are equal, and the sensing component is configured to generate the second signal. For a sensing component in the rolled part, resistance values of the first resistor and the third resistor are different from resistance values of the second resistor and the fourth resistor, and the sensing component is configured to generate the first signal.

The display panel further includes a first power line and a second power line. A voltage difference between the first power line and the second power line is greater than zero. The first input end of each of the multiple sensing components is electrically coupled with the first power line, and the second input end of each of the multiple sensing components is electrically coupled with the second power line.

The first resistor and the third resistor each are a force-sensitive resistor.

The display panel includes an active layer, and the sensing components and the active layer are on the same layer.

A display device is further provided in the disclosure. The display device includes the display panel described above and a reel coupled with the display panel. The display panel is rollable and flattenable relative to the reel.

In summary, the disclosure provides the display panel. The display panel can be in the flattened state or the rolled state. When the display panel is in the partially-rolled state, a sensing component in the partially-rolled part generates the second signal, and a sensing component in the flattened part generates the first signal. Because the display panel is partially rolled along the first direction, the sensing component in the rolled part is subjected to a stretching force, while the sensing component in the flattened part is not subjected to such stretching force. Therefore, there is a difference between the second signal and the first signal. According to the difference between the second signal and the first signal, a position to which the display panel is rolled can be identified.

The foregoing implementations are only preferable implementations of the disclosure, and cannot be used to limit the scope of the disclosure. Those of ordinary skill in the art can understand all or part of the process for performing the foregoing implementations of the disclosure, and that the equivalent changes made in accordance with the claims of the disclosure still lies in the scope of the disclosure.

What is claimed is:

1. A display panel, comprising a display region and a non-display region surrounding the display region, the non-display region being provided with a plurality of sensing components, wherein the plurality of sensing components each are configured to generate a first signal when the display panel is in a flattened state;

when the display panel is in a partially-rolled state, the display panel comprises a flattened part and a rolled part, a sensing component in the flattened part is configured to generate the first signal, and a sensing component in the rolled part is configured to generate a second signal; and the plurality of sensing components each are configured to generate the second signal when the display panel is in a fully-rolled state;

wherein the display panel further comprises a controller electrically coupled with each of the plurality of sensing components, and configured to control, according to the first signal and the second signal, the flattened part to display an image when the display panel is in the partially-rolled state; and each sensing component of the plurality of sensing components comprises:

a first input end;

a first detection end coupled with the controller;

a second input end;

a second detection end coupled with the controller;

a first resistor coupled between the first input end and the first detection end;

a second resistor coupled between the first detection end and the second input end;

a third resistor coupled between the second input end and the second detection end; and a fourth resistor coupled between the second detection end and the first input end, wherein a voltage difference between the first input end and the second input end is greater than zero; and when the display panel is in the partially-rolled state, for a sensing component in the flattened part, resistance values of the first resistor, the second resistor, the third resistor, and the fourth resistor are equal, and the sensing component is configured to generate the first signal; and for a sensing component in the rolled part, resistance values of the first resistor and the third resistor are different from resistance values of the second resistor and the fourth resistor, and the sensing component is configured to generate the second signal;

wherein the display panel further comprises a first power line and a second power line, a voltage difference between the first power line and the second power line is greater than zero, the first input end of each of the plurality of sensing components is electrically coupled with the first power line, and the second input end of each of the plurality of sensing components is electrically coupled with the second power line.

2. The display panel of claim 1, wherein the display region is provided with a plurality of data lines, the plurality of data lines are electrically coupled with the controller, and the controller is configured to:

when the display panel is in the partially-rolled state, control the flattened part to display an image by controlling, according to the first signal and the second signal, a data line in the flattened part to work.

3. The display panel of claim 1, wherein the display panel is rollable along a first direction, the non-display region comprises a first non-display sub-region and a second non-display sub-region, the first non-display sub-region and the second non-display sub-region are located on two opposite sides of the display region respectively along a second direction, some sensing components are spaced apart in the first non-display sub-region along the first direction, and some sensing components are spaced apart in the second non-display sub-region along the first direction.

4. The display panel of claim 1, wherein the display panel is rollable along a first direction, and the plurality of sensing components are spaced apart along the first direction.

5. The display panel of claim 1, wherein the first resistor and the third resistor each are a force-sensitive resistor.

6. The display panel of claim 1, wherein the display panel comprises an active layer, and the sensing components and the active layer are on a same layer.

7. The display panel of claim 1, wherein each of the plurality of sensing components defines a through hole penetrating the sensing component.

8. A display device, comprising:

a display panel; and a reel coupled with the display panel, wherein the display panel is rollable and flattenable relative to the reel, and the display panel comprises a display region and a non-display region surrounding the display region, the non-display region is provided with a plurality of sensing components, wherein the plurality of sensing components each are configured to generate a first signal when the display panel is in a flattened state;

when the display panel is in a partially-rolled state, the display panel comprises a flattened part and a rolled part, a sensing component in the flattened part is configured to generate the first signal, and a sensing component in the rolled part is configured to generate a second signal; and the plurality of sensing components each are configured to generate the second signal when the display panel is in a fully-rolled state;

wherein the display panel further comprises a controller electrically coupled with each of the plurality of sensing components, and configured to control, according to the first signal and the second signal, the flattened part to display an image when the display panel is in the partially-rolled state; and wherein each sensing component of the plurality sensing components comprises:

a first input end;

a first detection end coupled with the controller;

a second input end;

a second detection end coupled with the controller;

a first resistor coupled between the first input end and the first detection end;

a second resistor coupled between the first detection end and the second input end;

a third resistor coupled between the second input end and the second detection end; and a fourth resistor coupled between the second detection end and the first input end, wherein a voltage difference between the first input end and the second input end is greater than zero; and when the display panel is in the partially-rolled state, for a sensing component in the flattened part, resistance values of the first resistor, the second resistor, the third resistor, and the fourth resistor are equal, and the sensing component is configured to generate the first signal; and for a sensing component in the rolled part, resistance values of the first resistor and the third resistor are different from resistance values of the second resistor and the fourth resistor, and the sensing component is configured to generate the second signal; and wherein the display panel further comprises a first power line and a second power line, a voltage difference between the first power line and the second power line is greater than zero, the first input end of each of the plurality of sensing components is electrically coupled with the first power line, and the second input end of each of the plurality of sensing components is electrically coupled with the second power line.

9. The display device of claim 8, wherein the display region is provided with a plurality of data lines, the plurality of data lines are electrically coupled with the controller, and the controller is configured to:

when the display panel is in the partially-rolled state, control the flattened part to display an image by controlling, according to the first signal and the second signal, a data line in the flattened part to work.

10. The display device of claim 8, wherein the display panel is rollable along a first direction, the non-display region comprises a first non-display sub-region and a second non-display sub-region, the first non-display sub-region and the second non-display sub-region are located on two opposite sides of the display region respectively along a second direction, some sensing components are spaced apart in the first non-display sub-region along the first direction, and some sensing components are spaced apart in the second non-display sub-region along the first direction.

11. The display device of claim 8, wherein the display panel is rollable along a first direction, and the plurality of sensing components are spaced apart along the first direction.

12. The display device of claim 8, wherein the first resistor and the third resistor each are a force-sensitive resistor.

13. The display device of claim 8, wherein the display panel comprises an active layer, and the sensing components and the active layer are on a same layer.

14. The display device of claim 8, wherein each of the plurality of sensing components defines a through hole penetrating the sensing component.

* * * * *